United States Patent

[11] 3,601,542

[72] Inventors Donald R. Gill
Fairport;
William H. Stewart, Webster; Bernard H. Root, Palmyra, all of, N.Y.
[21] Appl. No. 882,453
[22] Filed Dec. 5, 1969
[45] Patented Aug. 24, 1971
[73] Assignee Stromberg-Carlson Corporation
Rochester, N.Y.

[54] DYNAMIC RECORDER SYSTEM FOR TOLL TICKETING
28 Claims, 17 Drawing Figs.

[52] U.S. Cl. 179/9
[51] Int. Cl. H04m 15/10
[50] Field of Search 179/7, 7 MM, 7.1, 7.1 TP, 8, 9, 18 ES

[56] References Cited
UNITED STATES PATENTS
3,283,078 11/1966 Avery 179/9

*Primary Examiner*—Kathleen H. Claffy
*Assistant Examiner*—Thomas W. Brown
*Attorney*—Craig, Antonelli, Stewart and Hill

ABSTRACT: Dynamic recorder system for toll ticketing provided as time-shared equipment in connection with a common control system, wherein the data received from one of a plurality of recording trunks is stored in a unique one of a plurality of cells of a recirculating memory, each cell of the memory providing a plurality of words within which the necessary information relating to the direct dialed call may be stored and selective words within which the necessary timing of the system operation is carried out.

INVENTORS
DONALD R. GILL
WILLIAM H. STEWART
BERNARD H ROOT

BY
Craig, Antonelli, Stewart & Hill
ATTORNEYS

| PROGRAM BIT 1 | 2 | 3 | 4 | WORD FUNCTION | DYNAMIC WORD |
|---|---|---|---|---|---|
| | | | | NOT USED | 0 |
| SZ | FOH | | 2/5 | | 1 |
| | | | | MARK SPACE COUNTER | 2 |
| | | | | INCOMING WORD COUNTER | 3 |
| | | CL | | INCOMING WORD COUNTER | 4 |
| | | | | 4 SEC COUNTER | 5 |
| 1 1/2 | ELM | AS | | 0.4 mS COUNT | 6 |
| | | | | MARK & SPACE ENABLE | 7 |
| "A" OR 1st DIGIT | | | | | 8 |
| "B" OR 2nd DIGIT | | | | | 9 |
| "C" OR 3rd DIGIT | | | | AREA CODE AND CALLED NO. | 10 |
| 1st OR 4th DIGIT | | | | | 11 |
| 2nd OR 5th DIGIT | | | | | 12 |
| 3rd OR 6th DIGIT | | | | | 13 |
| 4th OR 7th DIGIT | | | | | 14 |
| 5th OR EMPTY | | | | | 15 |
| 6th OR EMPTY | | | | | 16 |
| 7th OR EMPTY | | | | | 17 |
| 1st | | | | CALLING NO. | 18 |
| 2nd | | | | | 19 |
| 3rd | | | | | 20 |
| 4th | | | | | 21 |
| 5th | | | | | 22 |
| 6th | | | | | 23 |
| 7th | | | | | 24 |
| BAY | | | | DATA REGISTER IDENTITY | 25 |
| SHELF | | | | | 26 |
| | | | | TROUBLE | 27 |
| | | | | ACCOUNTING CODE | 28 |
| | | | | TIME AND CHARGE | 29 |
| | | | | HOTEL | 30 |
| | | | | INFORMATION | 31 |

| (PROGRAM BIT) | (WORD FUNCTION) | (DYNAMIC WORD) |
|---|---|---|
| 1st OR EMPTY | BILLING NO. | 32 |
| 2nd OR EMPTY | | 33 |
| 3rd OR EMPTY | | 34 |
| 4th OR EMPTY | | 35 |
| 5th OR EMPTY | | 36 |
| 6th OR EMPTY | | 37 |
| 7th OR EMPTY | | 38 |
| 8th OR EMPTY | | 39 |
| 9th OR EMPTY | | 40 |
| 10th OR EMPTY | | 41 |
| INTERSTATE | RATE | 42 |
| INTRASTATE | | 43 |
| MO. TENS | DATE | 44 |
| MO. UNITS | | 45 |
| DAYS TENS | | 46 |
| DAYS UNITS | | 47 |
| HRS. TENS | TIME | 48 |
| HRS. UNITS | | 49 |
| MIN. TENS | | 50 |
| MIN. UNITS | | 51 |
| BAY | EQUIPMENT IDENTITY | 52 |
| SHELF | | 53 |
| POSITION | | 54 |
| UNITS | ELAPSED TIME | 55 |
| TENS | | 56 |
| HUNDREDS | | 57 |
| | | 58 |
| | | 59 |

FIG. 2

FIG. 3

| WORD | TIME SLOT | FUNCTION |
|---|---|---|
| 0 | 1 | NOT USED |
| | 2 | NOT USED |
| | 3 | NOT USED |
| | 4 | NOT USED |
| 1 | 1 | SEIZURE |
| | 2 | FINAL ON HOOK |
| | 3 | |
| | 4 | |
| 2 | 1 | MARK SPACE COUNTER |
| | 2 | MARK SPACE COUNTER |
| | 3 | MARK SPACE COUNTER |
| | 4 | MARK SPACE COUNTER |
| 3 | 1 | INCOMING WORD COUNTER |
| | 2 | INCOMING WORD COUNTER |
| | 3 | INCOMING WORD COUNTER |
| | 4 | INCOMING WORD COUNTER |
| 4 | 1 | INCOMING WORD COUNTER |
| | 2 | INCOMING WORD COUNTER |
| | 3 | CLOCK WRITTEN |
| | 4 | NOT USED |
| 5 | 1 | 4 SECOND COUNTER |
| | 2 | 4 SECOND COUNTER |
| | 3 | 4 SECOND COUNTER |
| | 4 | 4 SECOND COUNTER |
| 6 | 1 | FIRST 1 + 1/2 SECONDS DETECTED |
| | 2 | EXTRA LONG MIN. COMPLETE |
| | 3 | ANSWER SUPERVISION (PARTIES CONNECTED) |
| | 4 | |
| 7 | 1 | ONE MINUTE COUNTER |
| | 2 | ONE MINUTE COUNTER |
| | 3 | ONE MINUTE COUNTER |
| | 4 | ONE MINUTE COUNTER |

DYNAMIC RECORDER SYSTEM FOR TOLL TICKETING

The present invention relates in general to automatic telephone equipment, and more particularly to a toll-ticketing recorder for direct dialing equipment.

As soon as automatic telephone systems became a reality, eliminating the need for operators at each exchange to effect the necessary connections to establish a call, the direct dialed long distance call became a technical possibility. Even with the early step-by-step switching equipment, the equipment necessary to establish a communication connection from a subscriber to a long distance station solely in response to subscriber dialing was available. However, the need to automatically determine and record certain information concerning the direct dialed call, such as the elapsed time of the call, the rate applicable for the call, and the parties involved, delayed the realization of such automatic service for many years. However, with the advent of electronic switching systems including common control equipment the provision of equipment for determining the data necessary to the direct dialed long distance call was made possible.

The present invention relates to a dynamic recorder system for toll ticketing which is capable of simultaneously storing such information as the area code and called number, the calling number, the billing rate, the date of the call, the time of the call, and the elapsed time of the long distance call, in connection with a plurality of long distance calls. The dynamic recorder is provided as time shared equipment in connection with a common control system, wherein a plurality of such recorders in association with a plurality of recording trunks may be selectively connected to the common control equipment of the telephone exchange to receive and record data pertaining to a direct dialed long distance call.

In accordance with the present invention, the data received from one of a plurality of recording trunks associated with a dynamic recorder is stored in a unique one of a plurality of cells of a recirculating memory, the number of cells in the memory corresponding to the number of recording trunks associated with the dynamic recorder. Each cell or time frame of the recirculating memory provides a plurality of words within which the necessary information relating to the direct dialed long distance call may be stored. In addition, each cell or time frame is provided with sufficient functions of the dynamic recorder.

A unique feature of the present invention is the manner in which the counting of elapsed time of a call is effected. This timing is carried out within the recirculating memory so that special timing equipment need not be provided as part of the recording trunk circuits. Thus, the common control equipment need only indicate when answer supervision has been received and the timing of the call will be carried out automatically in the dynamic recorder.

Another important feature of the present invention relates to a unique means for adding information, to deleting or altering the information in the recirculating memory. A timing system for the dynamic recorder continuously provides output timing signals which designate the various words of each cell or time frame in the recirculating memory. The control portion of the memory provides a register for storing the designation of an incoming word for which some data manipulation is necessary. During each time frame of the recurring cycle, the designation stored in the incoming word register or counter is inserted into a storage arrangement, the contents of which are then compared in a comparator to the word designations received from the timing equipment. When a comparison between the stored data and the timing information is detected in the comparator, a transfer signal is generated which permits the data at the input of the recorder to be inserted in the recirculating memory. The word designation stored in the incoming word counter of the memory is then incremented by one unit so that during the next cycle the incoming data will be applied to the next successive word of the recurring time frame. In this way, the control of the data recirculating in the memory is effected in a particularly simple and advantageous manner.

Other important features of the present invention also include the provision of control circuitry for providing the standard 1½ second delay after detection of answer supervision before the counting of elapsed time is undertaken and the allowance of a long first minute in the elapsed time of the call. The provision for identifying the particular recorder associated with a given call along with the date and time of the call and other calendar information is also provided by the present invention.

It is therefore a principle object of the invention to provide a dynamic recorder system for toll ticketing which is greatly improved over those known systems presently available.

It is another object of the present invention to provide a dynamic recorder system for toll ticketing which is capable of storing and recording information received from the telephone exchange concerning a direct dialed long distance call and for automatically determining and storing the elapsed time associated with that call.

It is a further object of the present invention to provide a dynamic recorder system for toll ticketing which is greatly simplified in construction and more efficient and dependable in use as compared to those systems presently available.

It is still another object of the present invention to provide a dynamic recorder system for toll ticketing which includes self-contained elapsed time counting in connection with direct dialed long distance calls.

It is still a further object of the present invention to provide a dynamic recorder system for toll ticketing which exhibits a significant decrease in the holding time required to transfer information to the readout system as compared to those recorder systems presently available.

These and other objects, features and advantages of the present invention will become more apparent from the following detailed description thereof, when taken in conjunction with the accompanying drawings, which illustrate one exemplary embodiment of the present invention, and wherein;

FIG. 2 is a chart setting forth the schedule of words in a single cell or recurring time frame of the recirculating memory;

FIG. 3 is a table which sets forth in detail the time slot designation for words assigned to control functions for each cell of the recirculating memory;

Figure 1:
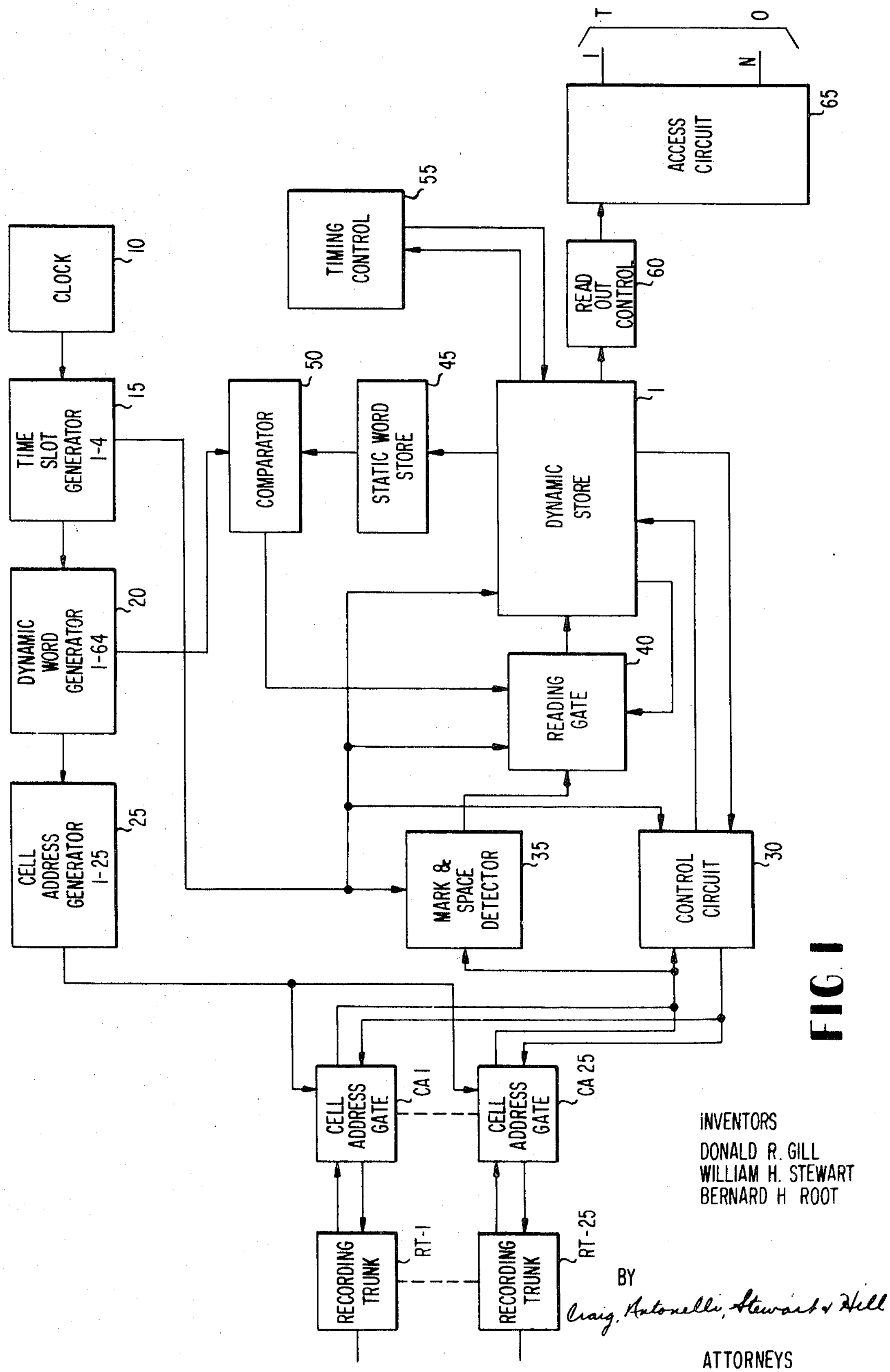
FIG. 1 is a schematic block diagram of the dynamic recorder system in accordance with the present invention.
Figure 4B:
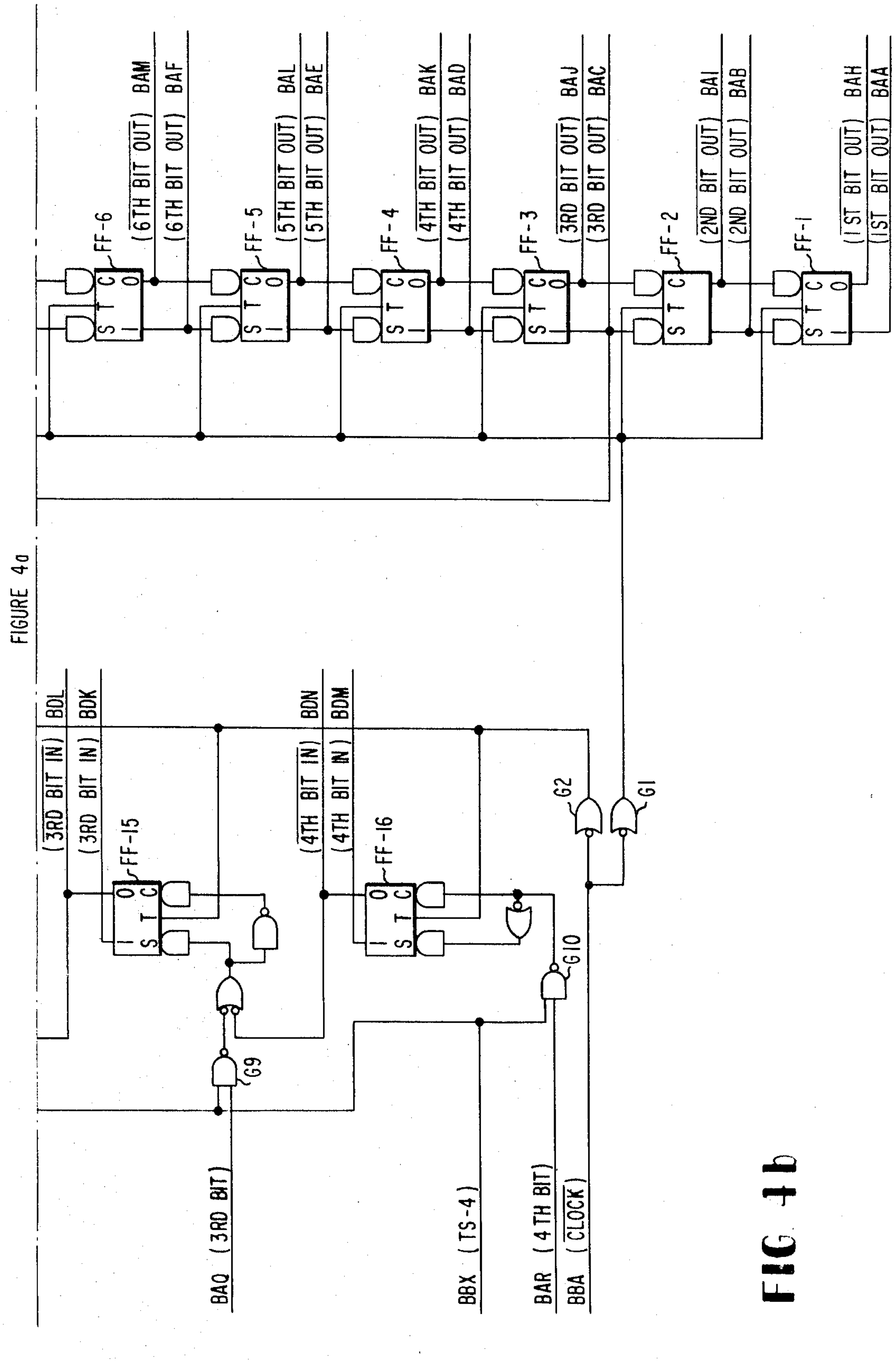
Figure 5:
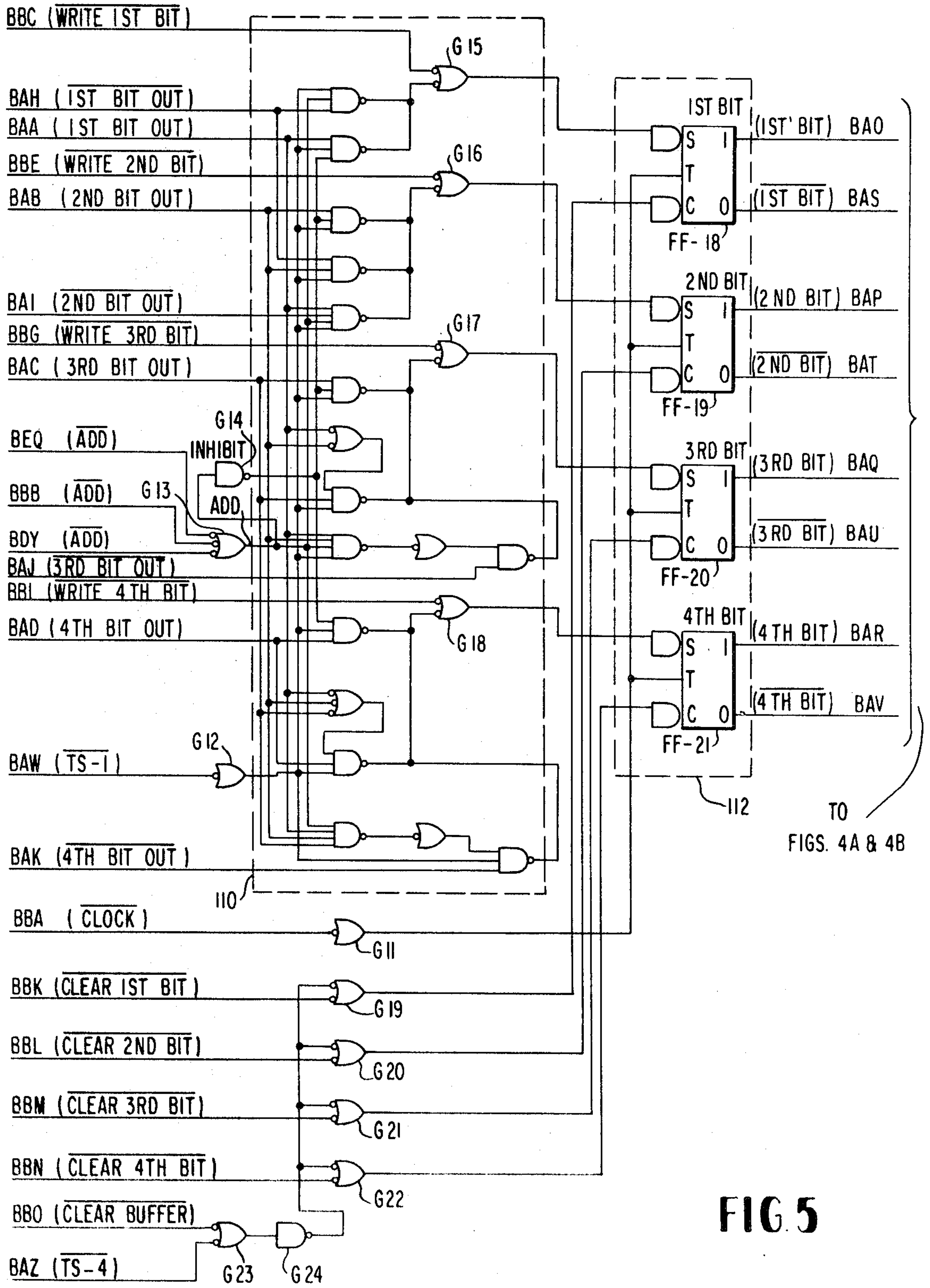
Figure 6:
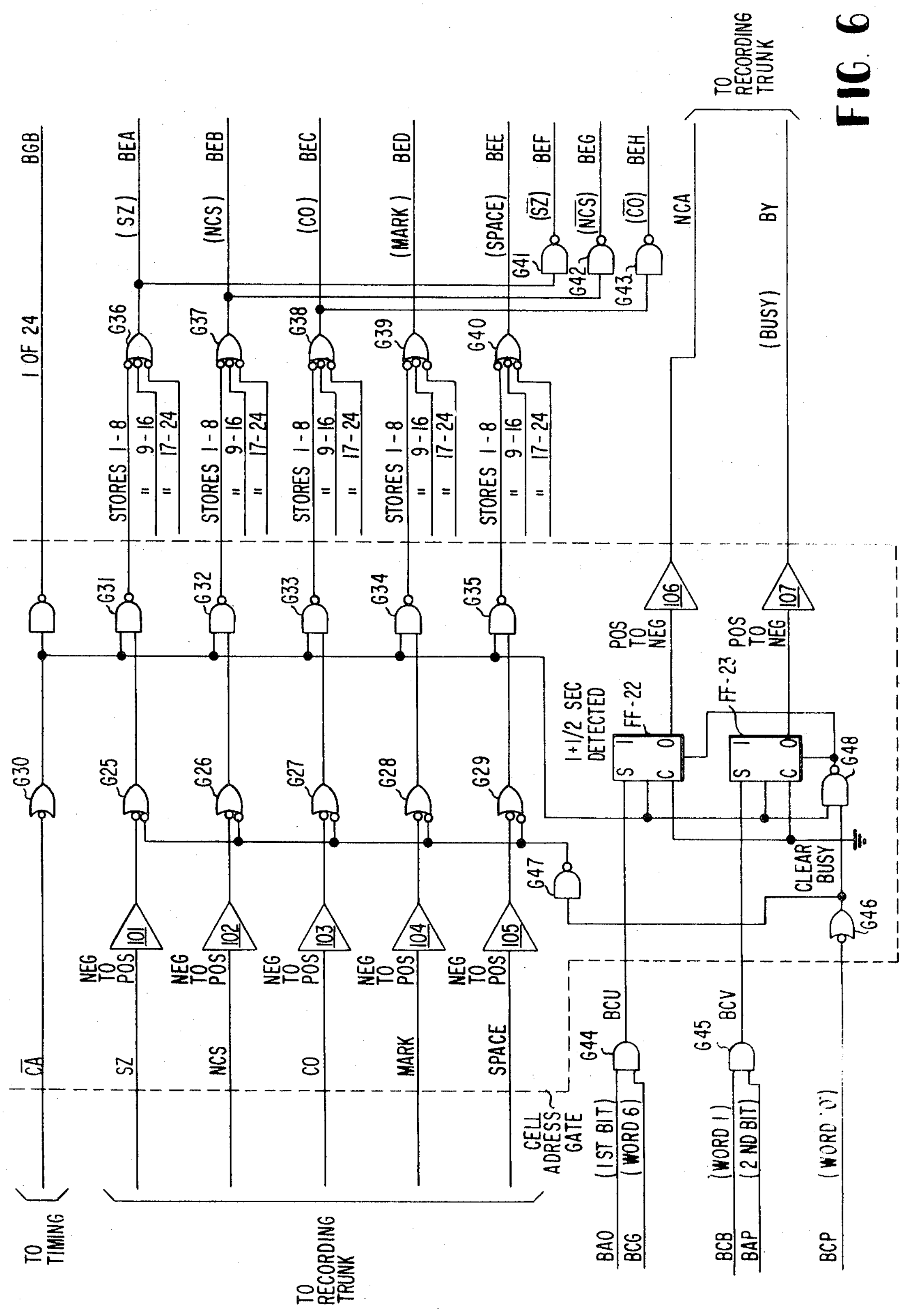
Figure 7A:
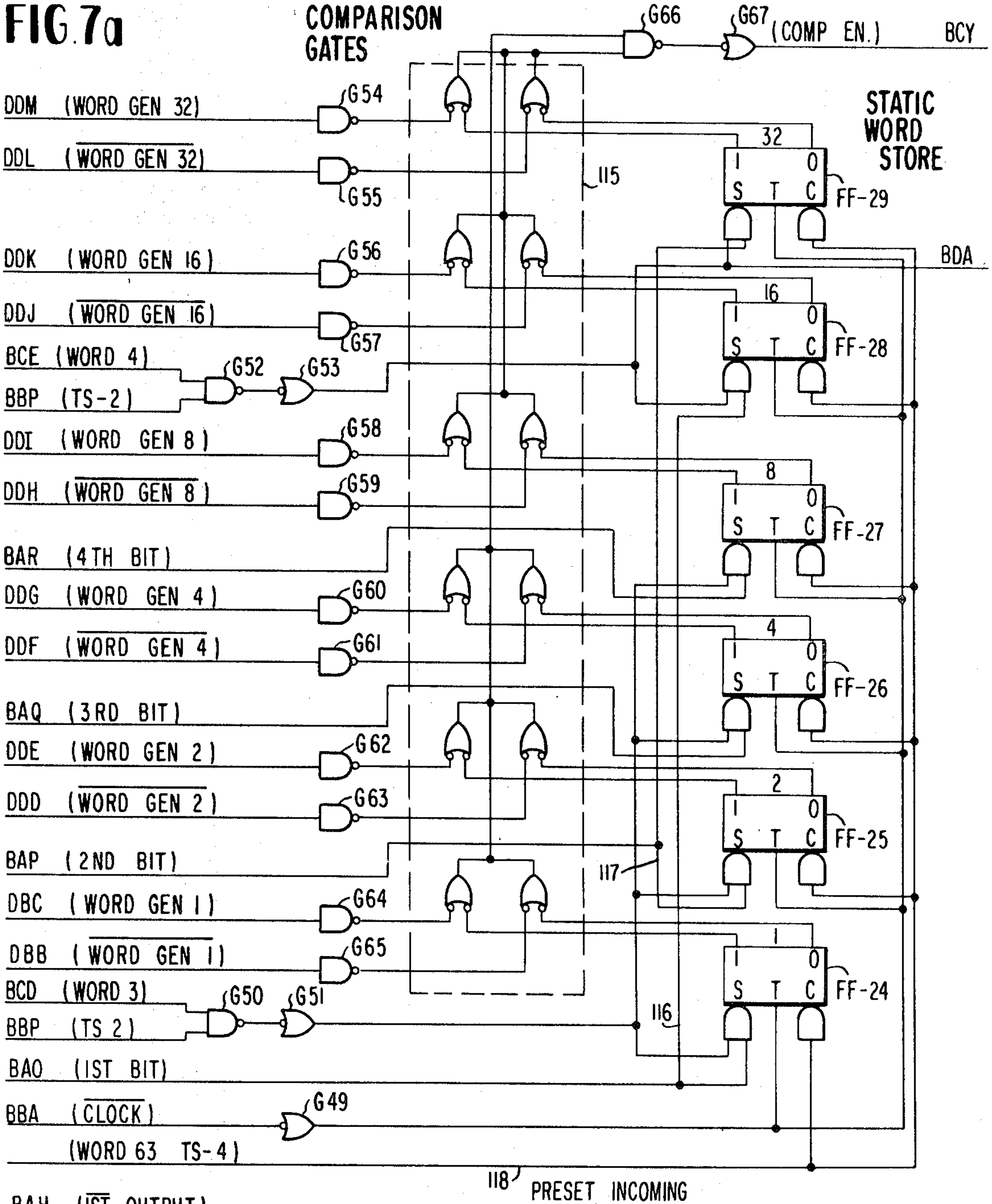
Figure 7B:
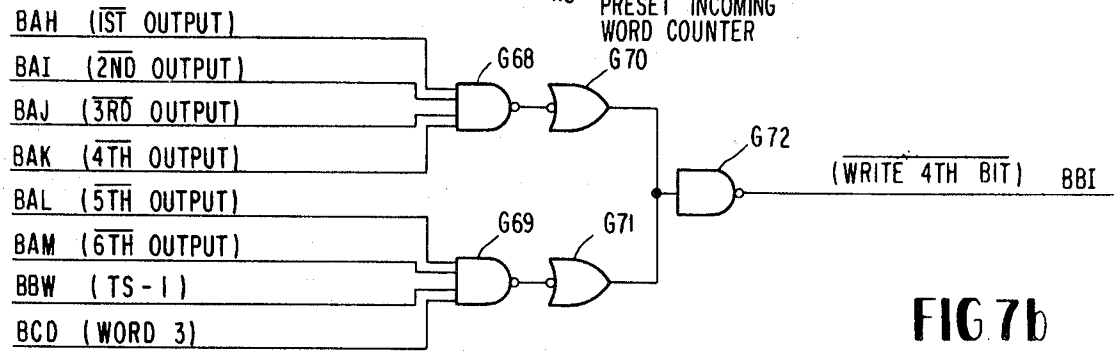
Figures 8, 10, 12:
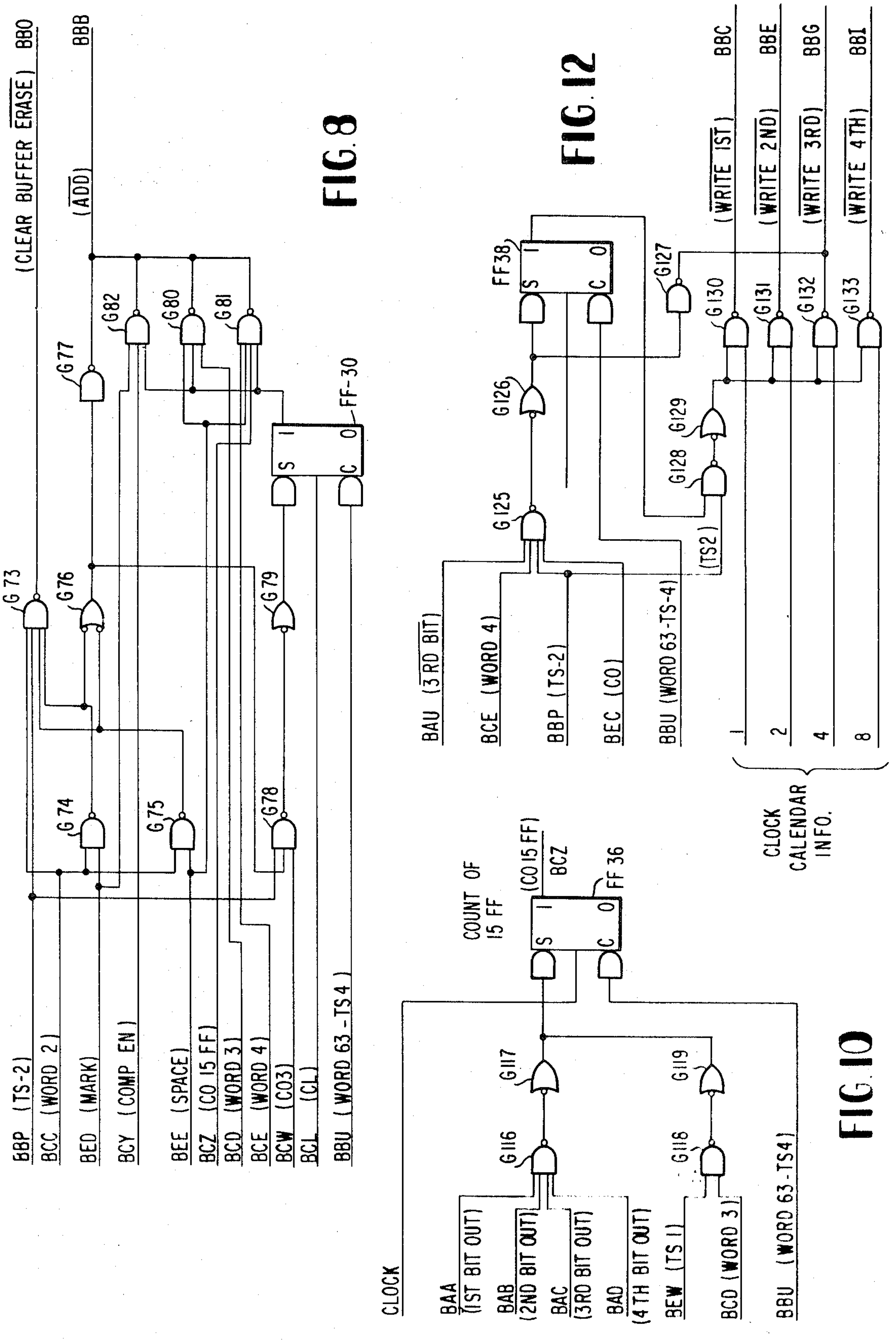
Figure 9A:
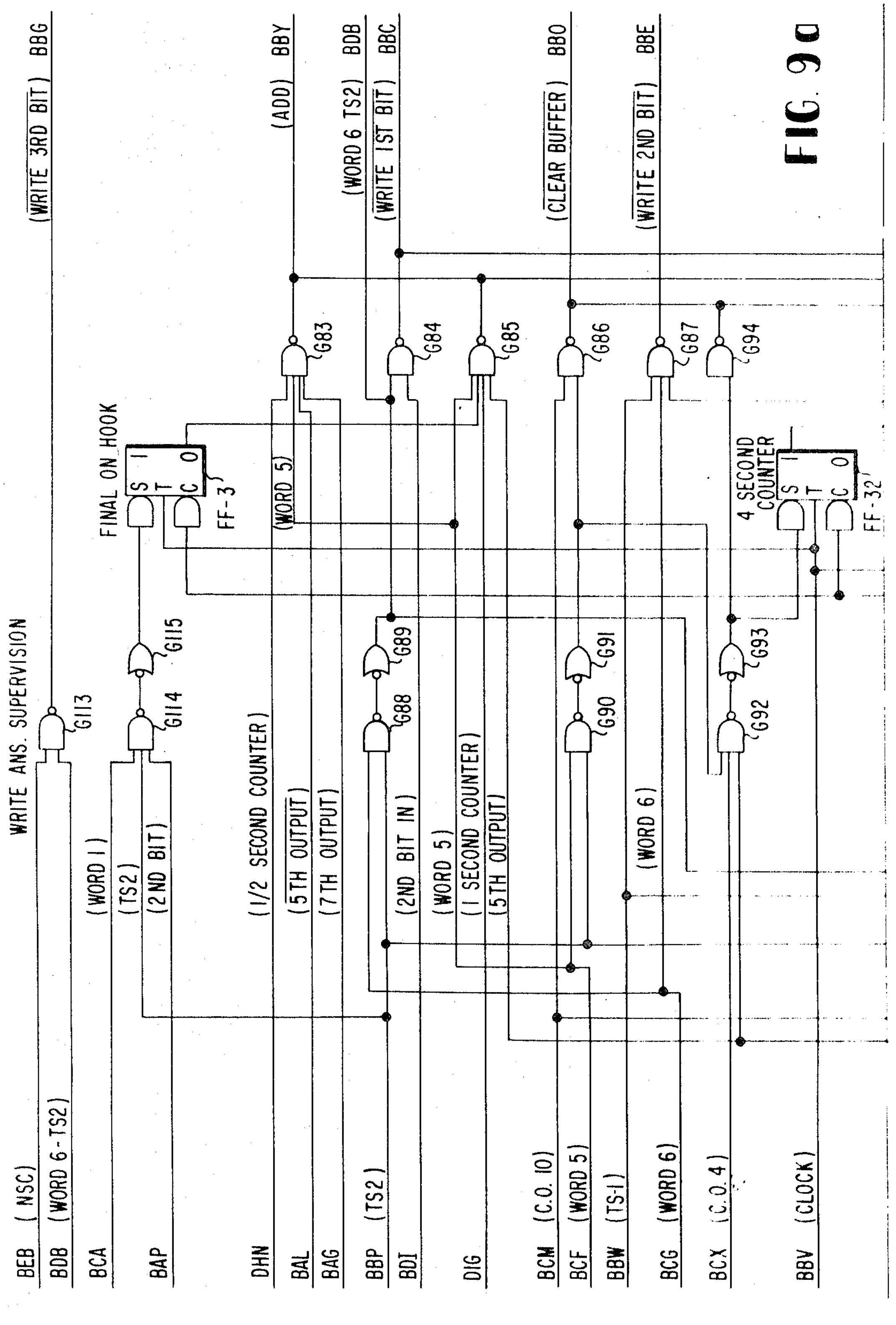
Figure 9B:
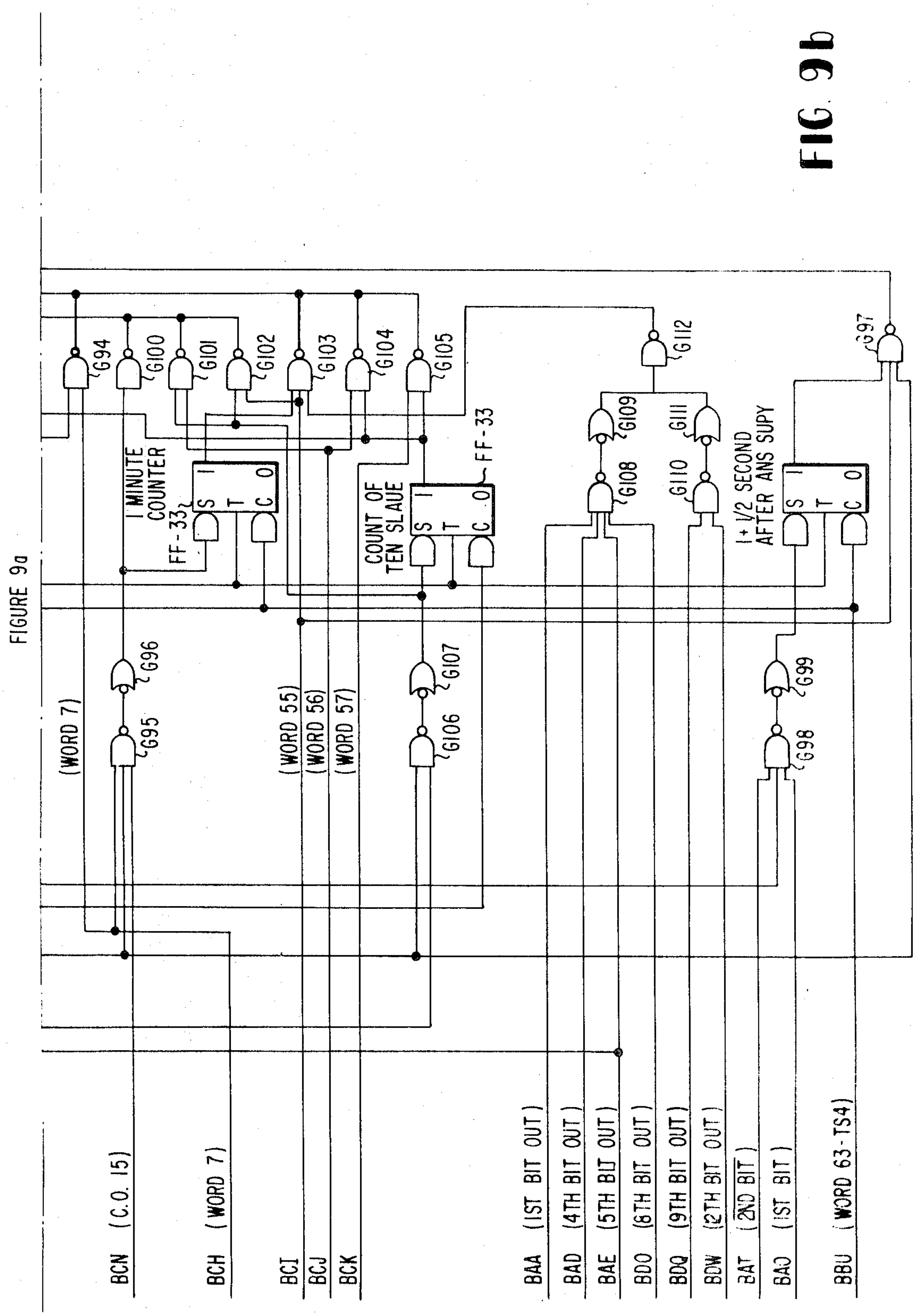
Figure 11:
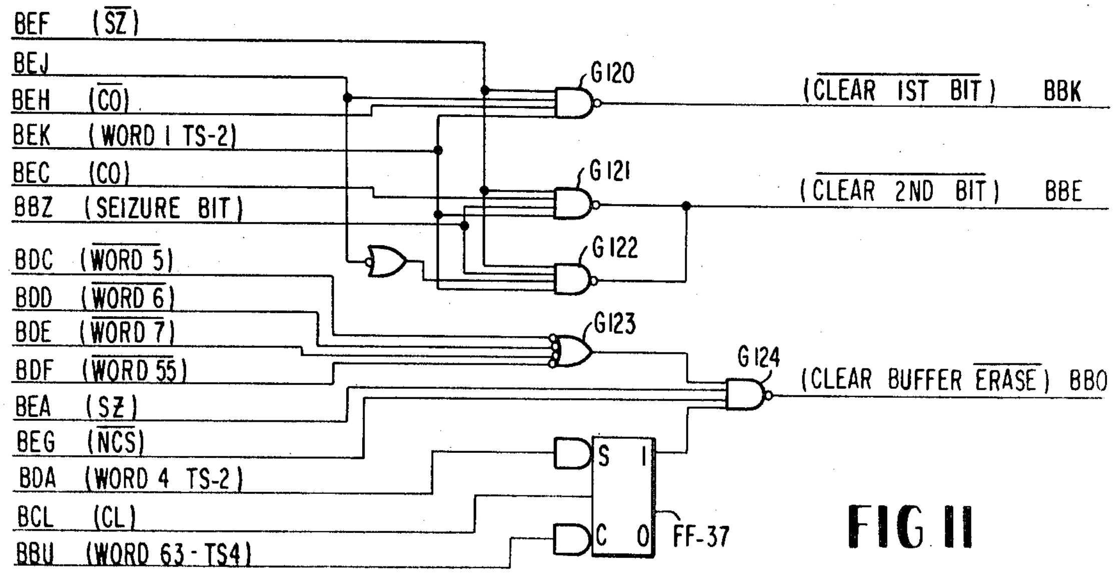
Figure 14:
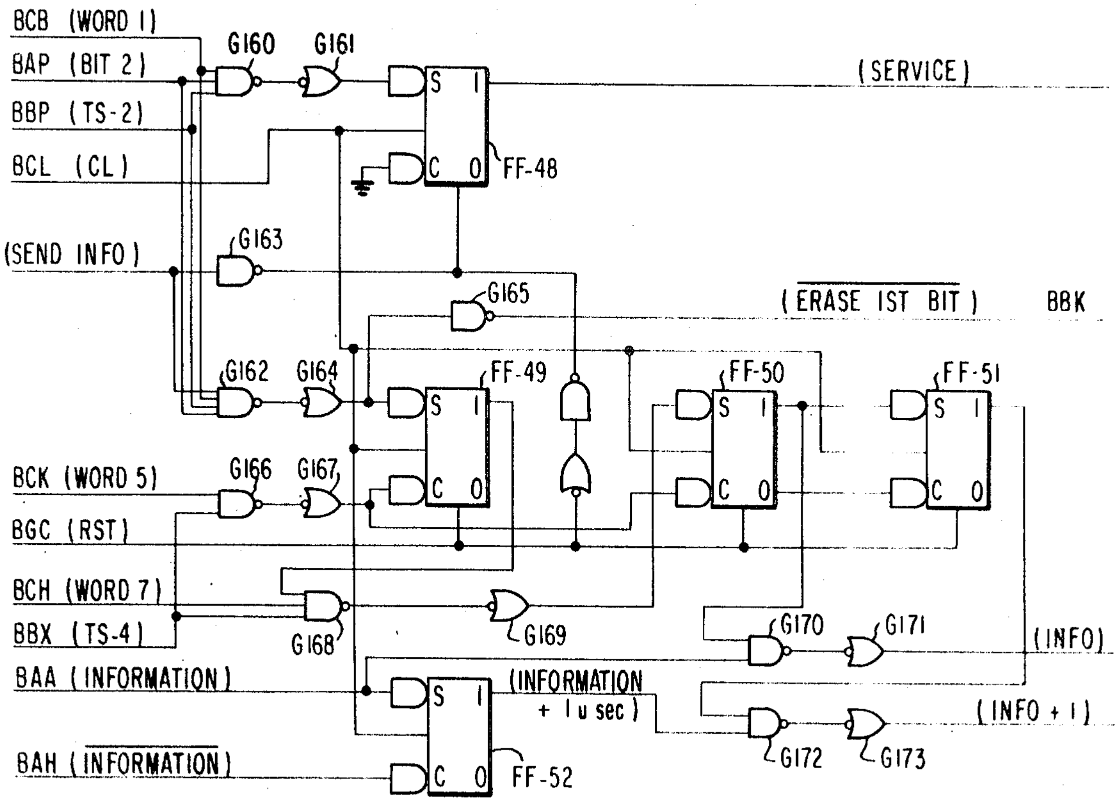
Figure 13:
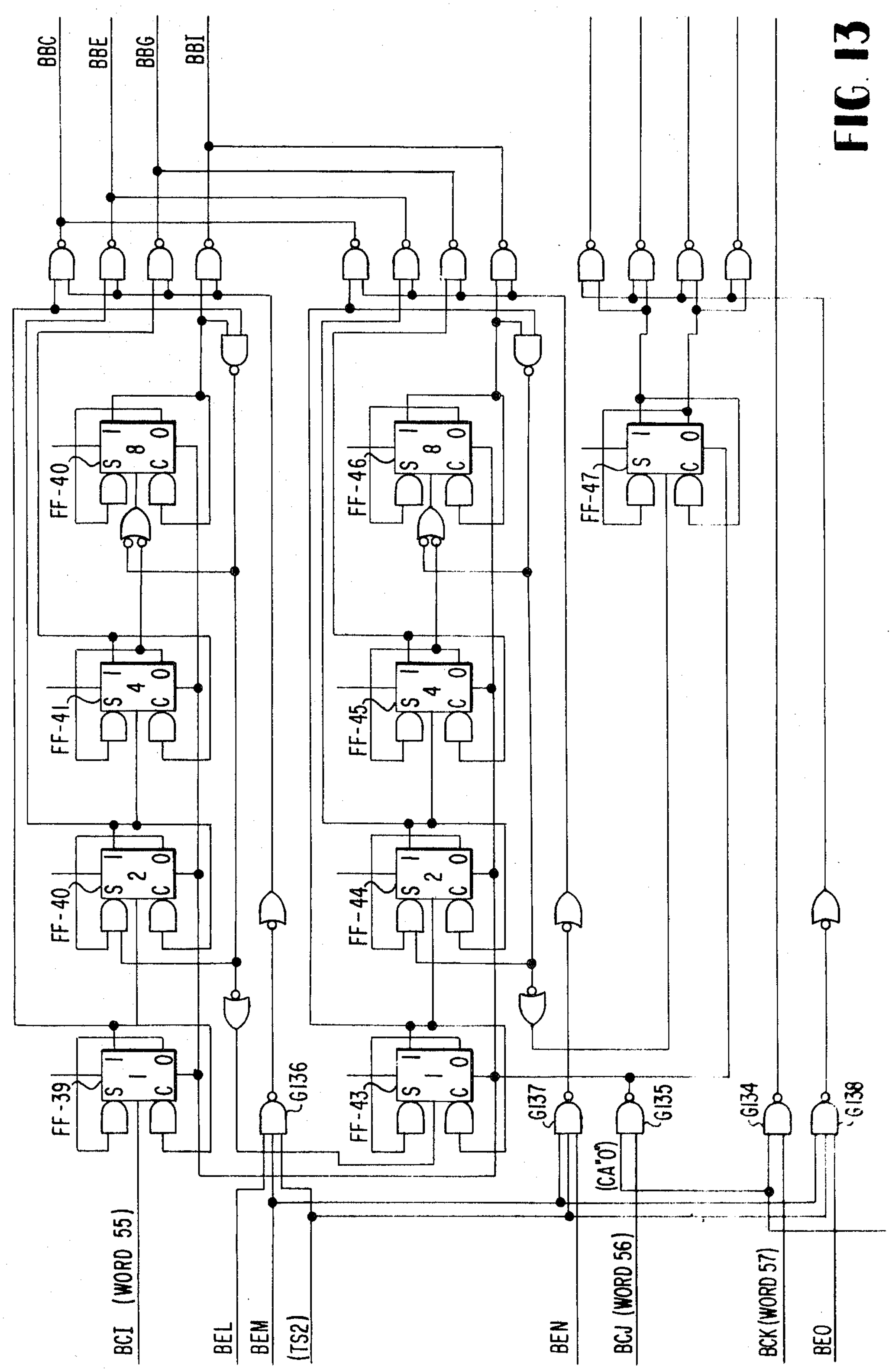

FIGS. 4*a* and 4*b*, when combined, provide a schematic diagram of the dynamic store for the system of FIG. 1;

FIG. 5 is a schematic diagram of a buffer system and control gate arrangement associated with the dynamic store of FIGS. 4*a* and 4*b*;

FIG. 6 is a schematic diagram of the input control portion of the system of FIG. 1;

FIGS. 7*a* and 7*b* are schematic diagrams of the static word store and comparator for the system of FIG. 1;

FIG. 8 is a schematic diagram of the mark and space detector for the system of FIG. 1;

FIGS. 9*a* and 9*b*, when combined, provide a schematic diagram of the timing control for the system of FIG. 1;

FIG. 10 is a schematic diagram of a control gate arrangement utilized with the system of FIG. 1;

FIG. 11 is a schematic diagram of a control gate arrangement relating to call complete and incomplete call functions for the system of FIG. 1;

FIG. 12 provides a schematic diagram of a control gate arrangement relating to the introduction of calendar information into the memory of the system of FIG. 1;

FIG. 13 is a schematic diagram of the counting arrangement for recording the identity of the recorder in the cell of the recirculating memory associated with a particular recording trunk in the system of FIG. 1;

FIG. 14 is a schematic diagram of the control arrangement providing for readout of the data from the recirculating memory to the associated readout equipment.

For purposes of description of an exemplary embodiment of the present invention, the following detailed description is based upon certain specific values of time, a selected number of calls associated with each recorder, specific frequencies of operation and other parameters. It should be understood that the detailed arrangement described herein is provided only to facilitate an understanding of the basic principles of the present invention and that variations in the stated parameters can be effected within the teachings of the present invention.

Referring first to FIG. 1, which provides a schematic block diagram of a recorder system in accordance with the present invention, a plurality of recording trunks RT–1 through RT–25 serve to interconnect the common equipment of the telephone exchange with the dynamic recorder system at the time a direct distance call is detected by the common control equipment at the exchange. The recording trunks when acquired by the common control equipment are associated with a particular call and serve to transfer to the dynamic recorder that data necessary for identification and billing, such as the called subscriber number, the calling subscriber number, an indication of answer supervision, an indication when the call has been completed, and other data relating to the particular call.

The data received by the dynamic recorder from the common control equipment via the recording trunks is stored in selective time slots of a repetitive time frame in a recirculating memory designated in FIG. 1 as the dynamic store 1. The recording system is time divided so as to provide for 25 cells, each capable of storing information relating to a direct dialed call. As a practical matter, the system provides for receipt of information from 24 simultaneous calls, with one cell being reserved for control functions and other control operations. The storage device to be used as a recirculating memory of 6.4 ms. in duration which enables each cell to have a 256 bit capability when operating at 1 MHz. Storing information in binary with 4 bits per word enables each cell to store 64 words.

Turning temporarily to FIG. 2, a chart of the time frame forming each of the plurality of cells of the recirculating memory is provided with an indication of the function of the various words which make up the cell. Words 0 through 7 contain the control bits used for timing functions and other control functions within the dynamic recorder, as will be described in greater detail hereinafter in connection with FIG. 3. Words 8 through 17 serve to store the data relating to the area code and subscriber number of the called subscriber as determined from the dialed digits by the common control equipment at the exchange. Similarly, words 18 through 24 store the information received from the exchange identifying the number of the calling subscriber. Words 25 and 26 store the identity of the data register in the common control equipment at the exchange which handles the call to which the information stored in the particular cell is related. In this way, in case a malfunction in the equipment associated with a particular call occurs, the common equipment at the exchange which handled that particular call can be identified from the readout of information from the dynamic recorder. Words 27 through 31 are assigned to the storage of particular information relating to the call, such as whether time and charges should be provided, whether the call is associated with a hotel, and other pertinent information related to the call. Words 32 through 41 store data concerning the billing number associated with the call and words 42 through 51 provide the calendar information such as the rate, time, and date of the call. The equipment identity of the recording trunk and dynamic recorder associated with the call is stored in words 52 through 54 so that this data along with that stored in words 25 and 26 will aid in the tracing of malfunctioning equipment. Words 55 through 57 serve to store the elapsed time of the call, this information being generated within the dynamic recorder itself in accordance with one important feature of the present invention. Words 58 through 63 are available as spare storage areas which may be used to store any data which may be necessary and associated with the call.

Turning once again to FIG. 1, system timing for the dynamic recorder is provided by a clock 10 which provides output signals at a 1 MHz. rate to a time slot generator 15, which may take the form of a divider or other similar known arrangement for generating the time slots 1 through 4 which compose each word of the time frame. The time slot generator 15 drives a word generator 20, which also may be provided in the form of a divider or similar circuit, providing one output for each four inputs from the time slot generator 15. The dynamic word generator 20 generates the timing signals designating the 64 words of each cell of the time frame, and also drives a cell address generator 25 which produces an output for each 64 inputs from the dynamic word generator. The cell address generator counts from 1 through 25 to enable respective cell address devices CA1 through CA25, connecting the recording trunks RT–1 through RT–25 to the dynamic recorder in respective cell times of the recirculating memory. The timing pulses generated by the timing generators are distributed throughout the system to synchronize the operation of the various elements of the dynamic recorder system including the full system of stores as well as the readout of the data from the system.

Information is received by the dynamic recorder from the appropriate registers in the common control equipment at the exchange via the cell address gates CA1–CA25 from the trunk circuit so that each cell of the recirculating memory is associated with a particular recording trunk. Information is sampled by each cell address gate for 256 μsec. out of each 6.4 ms., which is the recirculation time of the memory. This information is allowed by each cell address gate to enter the appropriate section of the store for processing.

The outputs from the cell address gates CA1–CA25 are scanned in a repetitive manner under control of the cell address generator 25 and control circuit 30 detects seizure by the recording trunk indicating acquisition of the recorder for receiving information from that particular recording trunk. The control circuit 30 also serves to hold the recording trunk busy while waiting to transfer its information to the readout after the call has been completed, and also has the ability to detect complete calls and readout incomplete calls when desired. The control signals received from the common equipment at the exchange indicating answer supervision and termination of the call are also detected in the control circuit, which then initiates the necessary operations in the dynamic recorder system for starting and stopping the timing of the calls and erasing or reading out the information stored in the memory.

The mark and space detector 35 controls and enables all incoming marks and spaces. In the process of counting incoming digits from the recording trunks, a reading gate 40 connects the output of the mark and space detector to the dynamic store 1 for storage of the data therein. In each cell of the memory respective words are always assigned to the same information for all calls; thus, the data received from the recording trunk is arranged in a prescribed sequence so as to facilitate introduction of the data into the memory at the appropriate word. In this regard, a space enable is utilized to designate each new word in the information received from the recording trunk so that the mark and space detector 35 can determine when data concerning one word has been completely received from the recording trunk, and therefore that the following information should be inserted into the memory in the next word in the sequence.

For purposes of steering this information into the proper words in a selected call of the memory, a static word store 45 is connected to the dynamic store 1 and receives a binary designation of the first word of the cell to receive the information from the recording trunk. The designation stored in the static word store 45 is applied as one output to a comparator 50 which also receives timing signals from the dynamic word generator 20 indicating at each instance of time which word in a given cell in the dynamic store is available for receiving information. When the count applied to the comparator 50 corresponds to the designations stored in the static word store 45, a control signal is generated by the comparator 50 and applied to the reading gate 40 transferring the data detected by the mark and space detector 35 to the dynamic store 1. When the mark and space detector 35 detects a space enable at the input thereof, the incoming word designation stored in the memory for application to the static word store 46 is incremented by 1 so that subsequent data will then be inserted into the next word of the cell until an additional enable is detected by the mark and space detector 35. In this way, the data relating to words 8 through 41 which are received in that sequence from the recording trunk will be applied to the proper word in the memory automatically as a result of internal timing within the dynamic recorder system.

The dynamic recorder also includes a timing control 55 which performs the various timing functions such as counting the elapsed time of a call after an indication of answer supervision from the recording trunk, providing for the normal 1½ second delay before beginning count of the elapsed time, and providing for the extra long time period for the first minute of elapsed time counted in connection with a call. The timing control 55 operates in response to conditions detected from the dynamic store and the control circuit 30.

A readout control 60 is connected to the dynamic store 1 and serves to effect a readout of the data circulating within the dynamic store in connection with a particular cell in response to detection of a completed call situation. An access circuit 65 provides access from the readout control 60 to one of a plurality of readout devices. The means for transferring information from the dynamic store is handled easily because the readout and the cell address gate of the dynamic store are in synchronism with each other, being driven by the same timing source. The recirculation time of the readout is 256 $\mu$ sec and the cell address time is the same so that the maximum time required to transfer information into the readout is 6.4 ms., i.e., the recirculating time of the dynamic recorder.

As indicated previously, words 0 through 7 of the repetitive time frame provide for control bits which serve as counters, registers and timing indicators in control of the operation of the dynamic recorder. FIG. 3 provides a chart of the schedule of functions for the bits associated with words 0 through 7. From the figure it is noted that word 0 is not used for a particular counting function; however, as will be indicated hereinafter occurrence of this word in the repetitive time frame is used for timing certain functions of the system. A bit in word 1, time slot 1, indicates seizure of the dynamic recorder by the recording trunk, and a bit in time slot 2 indicates final onhook by the subscribers representing a completed call. Word 2 serves as a mark space counter which supplies data to the various registers.

Word 3 and time slots 1 and 2 of word 4 provide the incoming word counter which designates the particular word to which the data received at that time from the recording trunk pertains. This incoming word counter is incremented by the mark and space detector each time a space enable is detected at the input thereof so that the information following the space enable will be inserted into the next successive word of the cell. The designation in the incoming word counter is the designation provided to the static word store 45 which is compared in the comparator 50 with the dynamic word generated by the dynamic word generator 20.

A bit in word 4, time slot 3, indicates that answer supervision has been received and the clock in formation is stored in memory pertaining to that call.

Word 5 provides a counter which is utilized by the timing control 55 to count elapsed time. The counter represented by word 5 is incremented each second until it reaches a count of 4 at which time a minute counter represented by word 7 is incremented. Each time the minute counter represented by word 7 reaches a count of 15, the count in words 55, 56, and 57 representing the elapsed time of the call is incremented by a unit indicating expiration of another minute.

Word 6 also provides for control and timing indication. A bit in time slot 1 of word 6 indicates that 1½ seconds have elapsed after answer supervision so that timing of the call can be initiated. Since as a general policy it is desirable to provide an extra long minute for the first minute of the call, an incrementing of the count in words 55, 56 and 57 for the second minute is not initiated until an extra long count has been completed in the timing control 55, as designated by a bit in time slot 2 of word 6. Time slot 3 of word 6 provides an indication of answer supervision.

The makeup of the dynamic recorder 1 is shown in greater detail in connection with FIGS. 4*a* and 4*b*. The basic element of the dynamic store is a 6.384 $\mu$sec. delay line 100 having an input 101 and an output 102. This delay line 100 may take any known form or configuration providing the necessary delay time. Associated with the delay line 100 is an output shift register consisting of flip-flops FF–1 through FF–12 connected in series with the output 102 of the delay line. Associated with the input 101 of the delay line is an input shift register comprising flip-flops FF–13 through FF–16.

The primary function of these circuits is to form the recirculation path for the stored information, permitting information to be introduced into the delay line and retrieved therefrom and also providing means for detecting the presence of information in certain time slots of the memory for control purposes. New information enters the recirculation path via the input shift register which receives 4 bits at a time in parallel on input lines BAO, BAP, BAQ and BAR via AND gates G7 through G10. Similarly, data is derived from flip-flops FF–1 through FF–4 in parallel via output lines BAA, BAB, BAC and BAD which are applied to the input leads to the input shift register via a control gate arrangement 110 and buffer stores 112 illustrated in FIG. 5.

Thus, the recirculation path in the dynamic store includes the delay line 100, the output shift register consisting of flip-flops FF–1 through FF–12, the buffer store 112 and the input shift register consisting of flip-flops FF–13 through FF–16. New information can be introduced into the input shift register every 4 $\mu$sec. This information will be enabled during time slot 4 of each word, which is applied from input BBX to each of the AND gates G7 through G10 of the input shift register. The flip-flops in the output shift register and input shift register are operated in synchronism with applied clock pulses from the input lead BBA from the timing circuit so that recirculation is effected in synchronism with the control functions.

As noted from FIG. 4*a*, data in the input shift register is shifted serially into the delay line from the output of flip-flop FF–13 through OR gate G4 to input 101. However, a seizure flip-flop FF–17 inhibits operation of the flip-flop FF–13 via gate G6 when the seizure flip-flop is in the reset condition. Under these circumstances, any data which may be circulating in the memory is prevented from passing flip-flop FF–13 and therefore is effectively erased. Thus, so long as data is to be retained in a particular cell of the recirculating memory, the seizure flip-flop must be set to prevent erasure of this data as it is applied to the input of the delay line.

In order to enable introduction of data and retention thereof in a cell portion of the memory, a write seizure gate G3 must be enabled in response to receipt of a seize signal SZ from the recording trunk at time slot 1 of word 2 indicating that the recording trunk associated with the particular cell has been acquired for storing data in connection with a long distance dialed call. The enabling of gate G3 applies an input through gate G4 writing a bit into time slot 1 of word 1 in the memory so that the bit begins to circulate. As noted from FIG. 3, the seizure bit will appear at the output of flip-flop FF–3 at word 0, time slot 3, if it has been previously written into the cell via the gates G3 and G4. Detection of an output from the flip-flop FF–3 at time slot 3 of word 0 enables gate G5 which serves to set the seizure flip-flop FF–17 by its enabling gate thereby preventing further inhibiting of data flow through the flip-flop FF–13 to the delay line 100. If the following cell does not have the seizure bit written into time slot 1 of word 1, the seizure flip-flop will clear inhibiting data from recirculating during this cell address time.

With the seizure bit SZ written into the memory, four bits of input information from the buffer 112 (FIG. 5) will enter the input shift register on the trailing edge of time slot 4. This information will now be shifted at a 1 MHz. rate through the input shift register into the delay line and will appear again 6.384 ms. later at the store output 102. The information will be shifted along in the output shift register and will be transferred in parallel one word at a time out of the output shift register from flip-flops FF–1 through FF–4 into the buffer store 112 at the end of time slot 1. The input shift register adds 1 microsecond of storage to the recirculation loop, the output shift register adds 12 microseconds of storage to the recirculation loop and the buffer store 112 adds 3 microseconds of storage to the loop so that with the 6.384 ms. delay in the delay line 100 the total recirculation time of 6.4 ms.

FIG. 5 provides a control gate arrangement 110 in addition to the buffer store 112. The buffer store 112 includes flip-flops FF–18 through FF–21. The control gate arrangement 110 includes recirculation gates which provide for recirculation of data to the input shift register from the output shift register associated with the delay line 100. At the trailing edge of time slot 1, the control gate arrangement is enabled via gate G12 and the information in the output shift register is transferred to the buffer store via lines BAA, BAB, BAC, and BAD through OR gates G15 through G18 in the normal recirculation mode of operation. The control gate arrangement 110 also includes adder gates which provide for the adding of information from outside of the system to the stored data. If the information is desired to be added to that provided in the buffer store, one of the ADD leads BEQ, BBB or BDY to the OR gate G13 provides for the enabling of appropriate ADD gates and the inhibiting of the recirculation gates via gate G14. The ADD gates are arranged so as to increment the data provided on the input thereto by one unit thereby advancing the count stored in connection with a particular word. The information enters the buffer in parallel and is transferred from the buffer in parallel to the input shift register.

Information can be updated and changed while it is in the buffer by way of the WRITE leads BBC, BBE, BBG, BBI and the CLEAR leads BBK, BBL, BBM and BBN via gates G19–G22 connected to the flip-flops FF–18 through FF–21 of the buffer store. A clearing of all of the data in the buffer store 112 is also accomplished via input BBP or input BAZ via gates G23 and G24 which enable each of the gates G19–G22. The flip-flops FF–8 through FF–21 operate in synchronism with applied clock pulses from input BBA via Gate G11 so as to be synchronized with the control functions of the other elements of the system.

A typical cell address gate is illustrated in FIG. 6. Inputs SZ, NCS, CO, MARK and SPACE from the recording trunks are converted from negative to positive logic inverters 101 through 105 and applied through respective OR gates G25 through G29 to cell address AND gates 631–635 The cell address gates 631 through 635 are enabled by an appropriate timing signal from the output of cell address generator 25 (FIG. gate G30 so that the data from a particular recording trunk is connected to the dynamic recorder only during the cell address time of the recirculating memory to which it is assigned. The time divided outputs from the cell address gate are applied through OR gates G36 through G40 for connection to various inputs in the control systems of the dynamic recorder. The line BEA provides the seize signal SZ from the dynamic recorder indicating that the recording trunk is associated with the recorder for applying data thereto for storage and readout. The line NCS provides for an indication of answer supervision from the common equipment in the exchange, indicating that a communication has been established between parties. The line CO provides an indication that the call is complete, i.e., that the subscribers have released. Marks and spaces are received on the lines MARK and SPACE, respectively. In addition, not logic outputs are provided from the lines BEF, BEG and BEH ($\overline{SZ}$, $\overline{NCS}$ and $\overline{CO}$) via the inverting AND gates G41 through G43, respectively.

A flip-flop FF–22 is also provided in FIG. 6 which is set approximately 1½ seconds after answer supervision has been detected, the setting of this flip-flop serving to mark the lead NCA back to the trunk to indicate to the recording trunk that a billable call is in process. A second flip-flop FF–23 is also provided which is set in response to an indication that a call has been completed and the subscribers have released. The setting of this busy flip-flop provides an output via the inverter 107 to line BY to the recording trunk to mark the trunk busy and thereby permit release thereof in response to release by the subscribers. The recording trunk must be prevented from accepting another call until the data in the cell of the memory associated with that recording trunk is completely read out. An output on the line BY busies the trunk until readout is completed. Since the readout will occur during one scan of the cell in the memory, at the beginning of the next scan of the memory indicated by word 0 the busy flip-flop FF–23 is reset thereby enabling the recording trunk to accept another call.

The static word store 45 and comparator 50 are illustrated in greater detail in FIG. 7*a*. The static word store consists of flip-flops FF–24 through FF–29, which serve as storage devices for the data in time slots 1 through 4 of word 3 and time slots 1 and 2 of word 4 representing the incoming word counter. During the time slot 2 of word 3, when the data of word 3 is in the buffer store 112, the outputs BAO through BAR of the buffer store are connected to the inputs of the flip-flops FF–24 through FF–27 of the static word store. The transfer is enabled during word 3, time slot 2, via gates G50 and G51 providing an enabling output to the first four flip-flops of the static word store. During time slot 2 of word 4 when the data of word 4 is present in the buffer store 112, outputs BAO and BAP are applied via lines 116 and 117 to the input of flip-flops FF–28 and FF–29 in the static store. The gating which permits transfer of this data during word 4, time slot 2, is applied via gates G52 and G53 to the associated flip-flops. Thus, during words 3 and 4, the data stored in the memory pertaining to the incoming word count is read into the static word store.

The output of the static word is applied to comparison gates 115. Also applied to the comparison gate 115 are the outputs from dynamic word generator 20 providing an instantaneous designation of the word to which access is available in the recirculating memory. The data from the dynamic word generator 20 is applied to the comparison gate 115 via gates G54 through G65. When the data stored in the static word store and the data received from the dynamic word generator coincide, an output is provided from the comparison gates 115 via gate G66 and G67 to provide a comparison enable output on line BCY. The timing of the flip-flops FF–24 through FF–29 is synchronized by application of clock thereto via gate G49. The information which is inserted into the static word store remains during the entire scan of the cell address time until word 63, time slot 4, when the data is erased via line 118.

Initially, the incoming word counter (words 3 and 4) has no count stored therein. However, the present incoming word counter gate, illustrated in FIG. 7*b*, continuously writes a bit into the fourth time slot of word 3 to present the count in the incoming word counter to a count of 8. This is done to prevent data from the recording trunks from entering the first 7 words of the cell address time, which are reserved for control functions. However, the bit written into the fourth time slot of word 3 will be continuously erased until the recorder is seized by writing the seize bit SZ into the first time slot of word 1. Thus, the static word store will begin at the count of 8 as a result of the operation of the present incoming word counter of FIG. 7*b*. This counter consists of gates G68 through G72 and operates only during word 3, time slot 1, and only when no count is stored in the incoming word counter consisting of word 3, time slots 1 through 4 and word 4, time slots 1 and 2. Thus, once the gate writes the count of 8 into the incoming word counter of the memory, the gate will be immediately and automatically disabled.

The mark and space detector 35 is illustrated in greater detail in FIG. 8. The clear mark and space counter gate G73 is enabled during word 2, time slot 2, in response to detection at gate G74 and G75 of no mark or space outputs from the mark and space leads from the cell address gate (FIG. 6). This enable clears the buffer store during word 2, which serves as the mark space counter. With a mark or space present the ADD lead BBB will provide an output from leads G76 and G77 to gate G13 connected to the control gates 110 associated with the buffer store (FIG. 5). With a mark or space applied from the cell address gate, the gates G76 and G77 will be enabled every recirculation until a count of 3 in word 2 is detected by the mark space flip-flop FF–30 via gates G78 and G79. The count of BCW lead BC0 is derived from a gating arrangement (not shown) which monitors the count in the buffer store 112 and provides outputs representing various counts stored in the buffer store. A simple AND combination is sufficient to provide such outputs. If the space lead BEE is marked, enabling gate G75, during word 3 which provides a portion of the incoming word counter, the gate G80 will be enabled to step the count in the buffer store by one unit via the output line BBB to the gate G13 (FIG. 5). This, of course steps the count in the incoming word counter, which is monitoring the space enable signals received by the recorder. When a count of 15 is registered in word 3 forming part of the incoming word counter, the next space enable pulse will advance the counter in word 3 to 0 and in word 4 time slot 1 will be incremented due to the enabling of gate G81 providing an ADD output on line BBB to the ADD gate G13 associated with the control gate 110 in FIG. 5. In this way, the incoming word counter can count up to the total of 64 words.

If a mark lead is marked to the input BED at gate G74, the gate G82 will be enabled in response to receipt of a comparison enable signal on line BCY from the comparison gate 115 in FIG. 7*a*. In this way, the marks received will be applied only to the proper word corresponding to the information which they represent. The mark space flip-flop FF–30 is provided to prevent noise from interferring with the control of the system. As indicated above, it is necessary that a mark or space be detected three times, which is indicated by the count in the mark space counter provided by word 2 of the cell, before the gates G80–G82 can be enabled by the flip-flop FF–30. This means that three samples of a mark or a space are obtained before it is considered as a valid signal.

The timing control 55 of FIG. 1 is shown in greater detail in FIGS. 9*a* and 9*b*. In order to provide the standard 1½ second delay prior to beginning the count of elapsed time of a call, the gate G83 is provided in the timing section (FIG. 9*a*), the output of which serves to increment the 4-second counter formed by word 5 of the memory every ½ second until it reached the count of 4. At this point, gate G84 writes a bit into the first time slot of word 6 indicating that the first 1½ seconds has been detected, and the writing of this bit into the memory enables the answer supervision flip-flop FF–35. With flip-flop FF–35 set, gate G97 will provide an output to the ADD lead BDY at word 55 thereby writing the first minute into the elapsed time count in word 55 of the cell.

The writing of a bit into time slot 1 of word 6 also serves to permit enabling of gate G85 at one second increments during word 5 to advance the 4-second counter. The counter in word 5 will now add a count every second. During the first minute of the completed call a count of 10 must be accumulated in the 4-second counter to ensure a long first minute, as is provided in accordance with standard procedure. At a detected count of 10 in the 4-second counter the count of 10 slave flip-flop FF–34 will be set, the set output of this flip-flop serving to enable gate G87 indicating that a long minute has been completed. The output of gate G87 writes a bit into time slot 2 of word 6 indicating that the extra long minute has been completed. A gate G94 is also provided which serves to clear the 4-second counter at appropriate times.

A 4-second counter flip-flop FF–32 is provided to increment the minute counter each time the 4-second counter (word 5) reaches a count of 4. When the minute counter reaches a count of 15 indicating that a minute has elapsed, the minute counter flip-flop FF–33 is set adding a unit through gate G103 to the count in word 55 of the cell. Gates G104 and G105 are enabled by the count of 10 slave flip-flop FF–34 and increment the count in words 56 and 57, respectively, at the appropriate time to advance the total count of time. Gates G100, G101 and G102 provide outputs to the buffer to clear the count in the minute counter and in words 55 and 56 at the appropriate times.

FIG. 10 illustrates the circuitry which provides the timing signal representing when a count of 15 is reached in the incoming word counter represented by word 3 of the cell. A flip-flop FF–36 is responsive to various outputs of the flip-flops FF–1 through FF–4 (FIG. 4*b*)at time slot 1 of word 3 via gates G116 through G119 to provide an output representing a count of 15. This output is applied through gate G81 to step the incoming word count.

FIG. 11 provides the circuitry which controls the release procedure in the recorder after the subscribers have released or if an incomplete call has been detected. Gate G120 when enabled serves to clear the seize bit SZ from time slot 1 of word 1 and gate G121 indicates that the call is complete by writing a bit into time slot 2 of word 1 indicating a final on-hooked condition. Gate G122 detects an incomplete call and initiates a writing of a bit into time slot 2 of word 1 also terminating the operation of the recorder in connection with this call. If an operator wishes to erase the timing of a call, the seize lead SZ will be released momentarily, which enables the erased timing gate G124 during word 4 upon setting of flip-flop FF–37. This clears all accumulated timing from the cell.

When it is determined that the call is complete, it is necessary to insert into the cell at words 42 through 51 the calendar information, such as the rate, date and time of the call. This is accomplished by the circuitry in FIG. 12. A completed call is detected at gate G125 which sets the calendar flip-flop FF–38 via gate G126. At the same time, gate G127 is enable writing a bit into time slot 3 of word 4 indicating that the clock is written. Calendar information is provided from equipment (not shown) which provides a continuous indication of date and time and the rate for interstate and intrastate calls for the particular date and time involved. This data is received from the calendar equipment in the order in which it is to be stored at the particular times corresponding to words 42 through 51 under control of the dynamic word generator 20. Thus, the calendar gates G130 through G133 will be enabled during time slot 2 of the appropriate words for the information via gates G128 and G129 and the data will be received on lines ECZ, EDA, EDA, EDB, and EDC.

Since a given recorder can handle only a limited number of calls determined by the size of the recirculating store, it will normally be necessary to provide a plurality of recorders in association with each telephone exchange. For purposes of identifying the equipment associated with a given call, in case a malfunction should occur necessitating the tracing of the equipment associated with the call, it is desirable to record the number of the recorder associated with a given call and the cell address associated with that call. This identification is stored in the equipment identity portion of the cell represented by words 52, 53, and 54. Assuming that a recorder is capable of handling 24 calls, so that 24 recording trunks will be associated with the respective cells of the recirculating store, a recorder identity circuit is provided which generates successive numerical designations of the cells during the recirculation time of the store to provide an indication of the recording trunk involved. This recorder identity circuit is illustrated in FIG. 13, includes a plurality of flip-flops FF–39 through FF–42 providing a unit count and FF–43 through FF–46 providing a tens count. Depending upon which group of 24 lines the recorder is associated with, it may be necessary to preset the count in the flip-flops FF–39 through FF–46 during the zero cell. For example, if the particular recorder is the second recorder provided in the exchange, with each recorder being associated with groups of 24 recording trunks, the first recording trunk associated with the recorder will be number 25. Thus, the flip-flops must be preset to a count of 25 to begin the designation of the respective recording trunks in the cell address.

The transfer of data from the recirculating store to the access circuitry is accomplished by the readout control 60 (FIG. 1) which is illustrated in greater detail in FIG. 14. When a final unhook is received at time slot 2 of word 1 a service flip-flop FF–48 is enabled via gates G160 and G161 at time slot 2 of word 1. The output of the flip-flop 48 which will notify the access equipment that service is required in the recording group. The access equipment then returns a signal to gate G162 in the recorder when a readout device is free requesting that information be sent. This condition enables the gates G162 and G164 to set flip-flop FF–49 and also enable gate G163 to reset the service flip-flop FF–48. At the same time, gate G165 is enabled providing an output which erases the seizure bit in time slot 1 of word 1. As indicated previously, when no seizure bit is present in time slot 1 of word 1, to maintain the set condition of the seizure flip-flop FF–17 (FIG. 4a) during the next scan of the cell, the data in the cell will be erased. However, since only a single scan of the cell is necessary to transfer information serially therefrom to the access circuit, the data can be read out during the present scan of the cell.

The readout is initiated with setting of the flip-flop FF–49. With flip-flop FF–49 set, the information enable flip-flop FF–50 will be set via gates G168 and G169 during word 7, time slot 4. Data received from output BAA of flip-flop FF–1 (FIG. 4b) will then be passed through gates G170 and G171 to the access equipment in serial form. One microsecond after the flip-flop FF–50 is enabled, flip-flop FF–51 will be enabled which allows checking of the transmitted information for error by enabling gates G172 and G173 which pass the delayed information through flip-flop FF–52 to the access equipment for comparison. At time slot 4 of word 57, the flip-flops FF–49, FF–50 and FF–51 will be cleared and the next clock pulse will clear the flip-flop FF–52 to end the information transfer cycle.

The operation of the recorder in accordance with the present invention is initiated by application of a seize pulse from gate G36 of the cell address gate to enable the write seizure gate G3 at the time slot 1 of word 1 thereby inserting a bit into the delay line 100 via gate G4. With the seize bit circulating in the dynamic store, the seizure flip-flop FF–17 will be set by enabling of the gate G5 at word 0, time slot 3, during each scanning of the particular cell in the dynamic store thereby enabling data stored in this cell to continuously recirculate through the delay line 100. As a result a presenting of the incoming word counter formed by word 3 and time slots 1 and 2 of word 4 to a count of 8 by the present incoming word counter illustrated in FIGS. 7b will be allowed to recirculate since the cell has now been seized. Thus, with the seize bit written into time slot 1 of word 1 and the incoming word counter preset to a count of 8, the dynamic recorder is prepared to accept data from the recording trunk.

The recorder identity which indicates the recording trunk which is associated with the call is also written into and retained in the cell due to the presence of the seize bit in word 1 thereof. Since each recording trunk is connected or associated with the recorder on a time share basis corresponding to the repetitive time frame of the dynamic store, the same recording trunk will always be associated with a corresponding cell address in the dynamic store. Accordingly, the recording trunk which handled a particular call can be determined merely by the identification of the cell address within which the data for the call has been stored. Accordingly, by merely storing a number identification of the cell address in each cell along with the other data for the call, it is possible to determine which of the recording trunks handled the particular call. To accomplish this numbering plan, all flip-flops FF–39 through FF–47 are cleared upon enabling of the reset gate G135 during cell address 0, word 56, and at word 57 of the same cell address, the preset gate G134 is enabled to preset the counter to the desired count for the first cell address. The preset for the flip-flops is wired into the recorder, and therefore is a fixed number for a given recorder. As an example, if the recorders are numbered 1 through 24, the flip-flops will be set to the count of 1, but if the recorders are numbered 25 through 48, the flip-flops will be set to a count of 25. If the trunk numbers include a hundreds designation, the numbered flip-flop FF–47 will be enabled at word 52 of cell address 1, while at word 53 the tens output will be enabled and at word 54 the units will be enabled. The trailing edge of word 55 also steps the identity counter to the next count which allows the following cell to receive the proper address. This sequence continues until the identity has been written into each cell address, the counter is then preset to 0 to start the same sequence during the next scan.

With the incoming word counter preset to a count of 8, the flip-flops FF–24 through FF–29 in the static word store (FIG. 7a) will be set to the count of 8 during words 3 and 4 so that when the dynamic count is generated by the dynamic word generator 20 (FIG. 1) reaches a count of 8, correspondence between the counts will be detected and an output will be received on line BCY from gate G67 to the gate G82 in the mark and space detector 35 (FIG. 8). At this point, the mark and space counter gate G73 has been enabled (word 2, time slot 2) so that the buffer store was cleared during word 2 resetting the mark space counter to 0, which condition is maintained until a mark or space is received from the recording trunk. If a mark or space is now received, such as the first mark designating the first digit of the area code or called number, gate G76 will be enabled during word 2 to advance the count in the mark space counter. The gate G76 will be enabled during every recirculation time of the dynamic store, and at a count of 3 in word 2, the mark space flip-flop FF–30 will be set by a gate G78 and G79 thereby enabling the step mark gate G82 during word 8 when an input is received on line BCY. Marks will continue to be counted in this manner until a space enable input is received for three consecutive scans necessary to enable the mark space flip-flop FF–30, which is reset during word 63 time slot 4 of each scan of the dynamic memory. If the space lead BEE is marked, the step space gate G80 will be enabled at word 3 to step the incoming word counter by one unit. Thus, further data received from the recording trunk will then be inserted into word 9 of the dynamic store under control of the comparison gate G115. When the count in the incoming word counter at word 3 reaches a count 15, as derived from an input from the count to 15 flip-flop FF–36 (FIG. 10) the count in word 3 will be stepped to zero via gate G80 and the count in time slots 1 and 2 of word 4 will be stepped by one unit via enabling of gate G81 so that a binary count of 16 is recorded in the incoming word counter. Successive word counting by the incoming word counter in response to the outputs from gates G80 and G81 in words 3 and 4 respectively, provide for a count up to 64, which accommodates all of the words in each cell address. In this way data received from the recording trunks for each of the successive words 8 through 41 are stored in the dynamic store.

As soon as answer supervision is detected in the recorder by output on line BEB from the cell address gate to the write answer supervision gate G113 (FIG. 9a). Enabling of the gate G13 occurs during word 6, time slot 2 and serves to write a bit into the third time slot of the word indicating answer supervision has been detected. It is therefore the function of the recorder to initiate the timing sequence necessary to count the elapsed time of the call, which is to be recorded in words 55–57 of the cell address.

With a bit written into time slot 3 of word 6 indicating answer supervision, as indicated by an input on line BAG from flip-flop FF–7, the indication that the first 1½ seconds has not been detected by lack of a bit in time slot 1 of word 6 as indicated by output on line BAL from flip-flop FF–5 serves to enable gate G83 during word 5 to increment the 4-second counter. A timing signal on line DHN from the timing system provides an input to the gate G83 each half-second until the 4-second counter reaches a count of 4, as indicated by an input on line BDI from flip-flop FF–14 during time slot 2 of word 6, enabling gate G84 to write a bit into time slot 1 of word 6. This produces an input on line BAO from flip-flop FF–3 during word 6, time slot 2, which enables the flip-flop FF–35 via gates G98 and G99. With the flip-flop FF–35 set, the gate G97 will be set at word 55, time slot 2 to write the first minute of the elapsed time.

With the writing of the first minute into the word 55 through enabling of gate G97, the 4-second counter gate G85 is provided with the required enabled conditions. These conditions are an indication of off hook from the reset output of the final on hook flip-flop FF–31, word 5, and the indication that the first 1½ second has been detected via line BAE from flip-flop FF–5. The gate G85 is enabled by the output of the 1-second counter from the timing system so that the 4-second counter will now add a count every second in word 5. In order to provide an extra long first minute, a count of 10 is accumulated in the 4-second counter. At the count of 10, the flip-flop FF–34 is enabled thereby enabling gate G87 which writes a bit into time slot 2 of word 6 indicating that the extra long minute operation is complete. At the same time, the 4-second counter will be cleared through enabling of gate G86 during word 5, time slot 2.

The 4-second counter flip-flop FF–32 will now be set each time the 4-second counter reaches the count of 4 via gates G92 and G93. The enabled conditions for these gates are word 5, time slot 2, count of 4, and extra long minute complete (fifth output BAE). The setting of the flip-flop FF–32 will now add to the minute counter in word 7 and also clear the buffer after each count of 4.

The minute counter flip-flop FF–33 will be set when the minute counter reaches the count of 15, the enable conditions for the setting of this flip-flop being word 7, time slot 2, and count of 15, via gates G95 and G96. The enabling of gate G96 also clears the minute counter by enabling gate G100. The setting of the flip-flop FF–33 enables the ADD units gates G103 at word 55 which allows the count in the elapsed time counter of the cell to advance by one unit. At the end of the cell time, the minute counter flip-flop FF–33 clears.

When the minute units counter in word 55 reaches a count of 10, the clear minutes units gate G102 is enabled by the output of flip-flop FF–34 and the input on line BCI indicating word 55. At word 56, the ADD tens gate G104 will be enabled adding a tens count to word 56. This sequence continues until the count of 99 minutes, at which point the count in the units and tens stores (words 55 and 56) are erased and the hundreds store is stepped to one via gate G105. After reaching the count of 999, this counter will be inhibited by the gating arrangement provided by gates G108 through G112, the output of which inhibits further enabling of the gate G103. Of course, if a thousands count is desired, a further control gate and an additional word for the count of the elapsed time can be provided utilizing the same control operation as discussed above.

When the subscribers release and the call is terminated, an output is received on line BEC from the call address gate which is applied to the call complete gate G121 (FIG. 11) and at the same time, the seize bit is removed from the line BEA. These conditions detected by the gate G121 during word 1, time slot 2, result in the writing of a bit into time slot 2 of word 1 indicating the final uphook condition. With the final unhook bit in time slot 2 of word 1, gates G114 and G115 (FIG. 9*a*) will be enabled thereby setting final unhook flip-flop FF–31. The setting of this flip-flop serves to inhibit further enabling of the gate G85 and thereby prevents further advance of the 4-second counter (word 5). Thus, the timing of the call is terminated at this point.

The receipt of a call complete signal on line BEC from the call address gate during word 4, time slot 2, also serves to enable complete call gate G125 (FIG. 12) which sets calendar flip-flop FF–38 via gate G126. The setting of the calendar flip-flop serves to transfer the calendar information via gates G130 through G133 to the dynamic store for recording in words 42 through 51.

With a bit written in time slot 2 of word 1 indicating final onhook, gates G160 and G161 (FIG. 14) will be enabled thereby setting the service flip-flop FF–48. This signals the access circuit 65 indicating a request for readout equipment for the data stored in the recorder. When a free readout is detected, the access circuit notifies the recorder by enabling the send information gate G162, which sets the flip-flop FF–49 via gate G164. At the same time, the service flip-flop FF–48 is reset via gate G163. The setting of flip-flop FF–49 results in subsequent setting of flip-flops FF–150 and FF–51, which enables information to be transferred to the readout in serial form and also to provide a check of the transmitted information for error. All of these flip-flops will be reset at the end of the cycle.

With the seize bit SZ erased from the dynamic store in the particular cell, at time slot 3 of word 0, gate G5 (FIG. 4*a*) will not be enabled so that the seizure flip-flop FF–17 will remain reset thereby inhibiting the setting of flip-flop FF–13 via gate G6. With the flip-flop FF–13 inhibited, data will be prevented from transfer to the delay line 100 thereby clearing the cell. The cell will then be ready to accept data relating to another call.

Since the recording trunk must be prevented from receiving data from a second call prior to complete readout of the data from a previous call stored in the appropriate cell of the dynamic store, it is necessary to mark the recording trunk busy after final unhook is detected. Thus, when a bit is written into time slot 2 of word 1 indicating final onhook, the gate G45 (FIG. 6) is enabled setting the busy flip-flop FF–23. The output of this flip-flop provides a signal to the recording trunk marking the trunk busy during this cycle. Since all of the data stored in the cell will be read out during this cycle, the busy flip-flop can be automatically reset at word 0 thereby freeing the recording trunk for association with a further call.

We claim:

1. A dynamic recorder for automatic telephone systems including a plurality of recording trunks providing data to be stored and supervisory signals indicating conditions of a communication connection comprising a dynamic store for storing data relating to respective communication connections in repetitive time frames made up of a plurality of successive words of time slots, mark and space detector means for detecting mark and space signals received from said recording trunks, storage control means for storing said mark and space signals detected by said mark and space detector means in prescribed words of a select time frame in said dynamic store, and timing control means responsive to an indication of answer supervision from a given recording trunk for counting and recording elapsed time in a selected time frame in said dynamic store.

2. A dynamic recorder as defined in claim 1 wherein each time frame of said dynamic store is assigned to a particular recording trunk, further including a plurality of cell address gates connecting said recording trunks to said recorder in succession during the corresponding time frames of said dynamic store.

3. A dynamic recorder as defined in claim 2, wherein said dynamic store includes a delay line, an input shift register connected to the input of said delay line for introducing data serially into said delay line, an output shift register connected to the output of said delay line for receiving data serially from said delay line, and buffer store means connected between said output shift register and said input shift register for transferring data in parallel therebetween.

4. A dynamic recorder as defined in claim 3, wherein said buffer store means includes data storage means for temporarily storing data transferred between said output and input shift registers and data control means for selectively modifying the data stored in said data storage means.

5. A dynamic recorder as defined in claim 4, wherein said storage control means includes an incoming word counter for storing a designation of the word in the time frame into which the data presently received from the recording trunk is to be stored, timing means providing an instantaneous designation of the word in the time frame presently stored in said data storage means, comparator means for generating a data transfer signal in response to detected correspondence between the designations received from said incoming word counter and said timing means, and a reading gate responsive to said data transfer signal for applying a detected mark signal to said data control means to increment the data stored in said data storage means.

6. A dynamic recorder as defined in claim 5 wherein said storage control means further includes a static word store connected to said comparator means and means for transferring the count in said incoming word counter to said static word store during each time frame for comparison with the output of said timing means.

7. A dynamic recorder as defined in claim 6, wherein said incoming word counter is formed by selective words in said dynamic store.

8. A dynamic recorder as defined in claim 3, wherein said input shift register includes transfer inhibit means for normally inhibiting transfer of data to the input of said delay line and seizure means responsive to detection of a seizure bit in a prescribed time slot of each repetitive time frame for deactivating said transfer inhibit means during the associated time frame, said seizure bit being received from a recording trunk in preparation of transfer of data to the recorder.

9. A dynamic recorder as defined in claim 2, wherein said mark and space detector means includes mark and space counter means for counting samples of said mark and space signals and signal verification means responsive to a given count in said mark and space counter means for indicating detection of a mark or a space signal.

10. A dynamic recorder as defined in claim 9, wherein said mark and space counter means is formed by selective words of said dynamic store.

11. A dynamic recorder as defined in claim 2, wherein said storage control means includes an incoming word counter for storing a designation of the word in the time frame into which the data presently received from the recording trunk is to be stored, timing means providing a designation of the word in the time frame which is presently available to receive data, comparator means for generating a data transfer signal in response to detected correspondence between the designations received from said incoming word counter and said timing means, and a reading gate responsive to said data transfer signal for transferring a detected mark signal from said mark and space detector means to said dynamic store.

12. A dynamic recorder as defined in claim 11, wherein said mark and space detector means includes a space detector gate responsive to a detected space signal for incrementing said incoming word counter.

13. A dynamic recorder as defined in claim 12, wherein said incoming word counter is formed by selective words in said dynamic store.

14. A dynamic recorder as defined in claim 2, wherein said timing control means includes an elapsed time counter and first time delay means for delaying the actuation of said elapsed time counter for a predetermined time subsequent to detection of answer supervision from a recording trunk.

15. A dynamic recorder as defined in claim 14, wherein said timing control means further includes second time delay means for providing a long first count in said elapsed time counter.

16. A dynamic recorder as defined in claim 15, wherein said elapsed time counter is formed by selective words in said dynamic store.

17. A dynamic recorder as defined in claim 16, wherein said timing control means further includes a minute counter, actuation means for incrementing said minute counter each 4 seconds, and means for incrementing said elapsed time counter each time said minute counter reaches a count of 15.

18. A dynamic recorder as defined in claim 17, wherein said actuation means includes a 4-second counter actuated each second and means for actuating said minute counter each time said 4-second counter reaches a count of four.

19. A dynamic recorder as defined in claim 18, wherein said minute counter and said 4-second counter are each formed by selective words in said dynamic store.

20. A dynamic recorder as defined in claim 18, wherein said timing control means further includes final on-hook detector means responsive to indication of a call complete condition from a recording trunk for inhibiting actuation of said 4-second counter.

21. A dynamic recorder as defined in claim 2, and further including readout control means responsive to indication of a call complete condition from a recording trunk for reading out the data stored in the associated time frame of said dynamic store in serial fashion.

22. A dynamic recorder as defined in claim 21, and further including holding means for marking a recording trunk busy for at least the period of one time frame often indication of a call complete condition therefrom to permit readout of the data in said dynamic store related thereto.

23. A dynamic recorder as defined in claim 8, and further including means responsive to indication of a call complete condition from a recording trunk for erasing the seizure bit from said prescribed time slot of the associated time frame.

24. A dynamic recorder as defined in claim 18, wherein said mark and space detector means includes mark and space counter means for counting samples of said mark and space signals and signal verification means responsive to a given count in said mark and space counter means for indicating detection of a mark or a space signal.

25. A dynamic recorder as defined in claim 24 wherein said mark and space counter means is formed by selective words of said dynamic store.

26. A dynamic recorder as defined in claim 25, wherein said storage control means includes an incoming word counter for storing a designation of the word in the time frame into which the data presently received from the recording trunk is to be stored, timing means providing a designation of the word in the time frame which is presently available to receive data, comparator means for generating a data transfer signal in response to detected correspondence between the designations received from said incoming word counter and said timing means, and a reading gate responsive to said data transfer signal for transferring a detected mark signal from said mark and space detector means to said dynamic store.

27. A dynamic recorder as defined in claim 26, wherein said mark and space detector means includes a space detector gate responsive to a detected space signal for incrementing said incoming word counter.

28. A dynamic recorder as defined in claim 27, wherein said incoming word counter is formed by selective words in said dynamic store